Patented Sept. 6, 1949

2,480,821

UNITED STATES PATENT OFFICE 2,480,821

DISTRIBUTION OF WATER-DISPERSIBLE MATERIAL THROUGHOUT THERMOPLASTIC POLYMERS

John Abeln Connell, Paterson, N. J., assignor to E. I. du Pont de Nemours & Company, Wilmington, Del., a corporation of Delaware No Drawing. Application January 24, 1948, Serial No. 4,208

11 Claims. (Cl. 260—41)

This invention relates to the distribution of water-dispersible materials throughout thermoplastic polymers and, more particularly, to the uniform distribution of colors throughout thermoplastic polymers.

Many methods have been devised in the past for the incorporation of color in thermoplastic polymers. The great majority of these methods depend upon vigorous mastication of the polymer and color in kneading equipment and in the presence of heat. The color is generally added after the polymer has been homogenized by a period of mastication. Color addition has been accomplished by four methods, namely (1) directly as dry or liquid color, (2) as color wet with a liquid that is a non-solvent therefore, this liquid being a solvent for the polymer, (3) as color dissolved in a liquid that is also a solvent for the polymer, (4) and as a master color concentrate which comprises a composition of polymer containing a high concentration of color, usually comminuted for easy handling.

The mastication method is characterized by several disadvantages which have not been circumvented over a long period of use. In the first place, it is necessary to masticate the polymer batch for a prolonged period in order to achieve a uniform incorporation of color. During this period the polymer batch must be maintained at a relatively high temperature to insure plasticity of the polymer. The combination of high temperatures and prolonged mastication in many cases causes degradation of the color, or polymer, or both. Thus, many otherwise desirable polymer/color compositions cannot be used. Also, polymers colored by this prior art method are susceptible to contamination by foreign matter during the prolonged mastication period. Further, batch to batch color duplication is very difficult due to variation in the degree of mastication, to physical loss of color, and to dependence upon the judgment of unskilled roll operators as to termination of the mastication period. In countless instances it is found that identical batches as to ingredient composition, require different periods of mastication to result in the same shade product. It has also been found, particularly in light transparent colors, that for some compositions uniform color incorporation is not possible by the mastication method, regardless of the period of mastication.

Recognizing these disadvantages, a recently described process (Marks U. S. Patent 2,309,522) provides for distribution of an aqueous color dispersion in an aqueous emulsion of polymer in the presence of a dispersing agent. The colored emulsion is dried on heated rolls and compacted. In this operation the temperature of the heated rolls is always maintained below that temperature at which the polymer constituent would colloid. This process results in a uniform distribution of color in the polymer, and the product may be successfully used for molding and extrusion. However, the process involves the removal of large quantities of water before the product is obtained. Furthermore, individual subdivided particles are not positively bound together in the formation of the conventional sized molding and extrusion pellets, and this tends toward loss of product through powdering. This process also requires employment of an aqueous emulsion of the polymer material, the formation of which will in some cases involve an additional operational step.

An object of the present invention is to provide an economical and practical process for effecting the uniform distribution of water-dispersible materials throughout thermoplastic polymers. A more particular object is to provide such a process for the uniform coloration of thermoplastic polymers. A further object is to provide such a process which will be more economical and avoid the various undesirable features of the prior art processes discussed above. Other objects will be apparent from the description of the invention given hereinafter.

The above objects are accomplished according to the present invention by dispersing a water-dispersible material in water in the presence of a dispersing agent, mixing the resulting aqueous dispersion with a thermoplastic polymer in granular form of particle size between 0.1 mm. and 2.0 mm. in a proportion such that the total water content amounts to 0.15% to 0.9% by weight of the polymer, and then masticating the resulting mixture at a temperature at least as high as the flow temperature of the polymer until the mixture is colloided.

In a more specific form, the invention comprises dispersing a color in water in the presence of 0.1% to 3%, by weight of the water and color, of a dispersing agent, mixing the resulting aqueous dispersion with a granular polymer of methyl methacrylate, styrene, or vinyl acetate, of particle size between 0.1 mm. and 2.0 mm. in a proportion such that the total water content amounts to 0.15% to 0.9% by weight of the polymer, and then masticating the resulting mixture at a temperature from 10° F. to 300° F. above the flow temperature of the polymer until the mixture is colloided. In normal practice, the colloided colored polymer is subdivided after the masticating step into molding powder pellets to be used in any of the conventional molding techniques.

The present invention resides to an important degree in the discovery that by observing the various conditions mentioned above, particularly that relating to the proportion range of water in the mixture of thermoplastic polymer with the aqueous dispersion, a uniform distribution of water-dispersible materials throughout thermoplastic polymers may be effected with surprising ease and economy. It has been found that mastication of the mixture merely to the point where the polymer becomes colloided, is sufficient to insure uniform distribution of the water-dispersible material as well as to remove the small amount of water originally present in the mixture. This is highly advantageous because it makes unnecessary the prolonged mastication necessary in most of the prior art processes to effect uniform distribution of colors or the like and, further, there is no necessity for the removal of large quantities of water as in the aforementioned Marks process, besides which the polymer is obtained in fully colloided form which permits the more satisfactory production of conventional sized molding and extrusion pellets.

The following examples, in which all parts are by weight unless otherwise stated, illustrate specific embodiments of the invention.

Example I

Granular methyl methacrylate polymer of particle size in the range of 0.1 mm. to 1 mm. was converted to a colored molding powder as follows:

An aqueous dispersion was prepared by mixing 5 parts of the dye Anthraquinone Blue Sky Base (AATCC), 95 parts water, and 0.2 part of the dispersing agent "Alronol 90" (a higher fatty acid amide) for 16 hours in a ball-mill mixer. This dispersion was then diluted with 224 parts of water.

270 parts of granular methyl methacrylate polymer of particle size as above were placed in a conventional double arm mixer. The mixer was started and allowed to run for two minutes to break up any lumps in the polymer. One part of the diluted color dispersion was added to the granular polymer while mixing and then one part of fresh water was added and the mixing continued for ten minutes. The contents of the mixer were directly added to a rotating heated two-roll mill, the forward roll being at a temperature of about 360° F., the back roll at a temperature of 340° F. Addition of the material required about ten minutes after which rolling was continued for five more minutes at the end of which time the polymer was fully colloided. The colloided colored polymer was withdrawn from the rolls and subdivided into molding powder pellets.

The product thus obtained was characterized by absolutely uniform distribution of color and freedom from contamination by foreign matter. Articles molded from the product exhibited no color streaks or mottle, and the exact color shade was readily reproduced in subsequent batches.

"AATCC" indicates that the dye may be identified by reference to "1946 Year Book of the American Association of Textile Chemists and Colorists vol. XXIII."

Example II

The procedure of Example I was repeated with certain variations as indicated below.

One series of batches was prepared using the same granular methyl methacrylate polymer as in Example I but with the dye: "Celanthrene" Red 3B conc. (AATCC). Five batches were prepared using this dye in the ratio of dye to water in the aqueous dispersion as follows: 1/99, 5/95, 10/90, 15/85, and 60/40.

Each batch of the above series exhibited the same uniform distribution of color as the batch in Example I, illustrating that the proportion of dye to water is not critical, provided, of course, that the dye is really dispersed in the water. If the proportion of dye to water were so great that the dye was not wet throughout, the resulting mixture would not be operative but, in such case, the dye also would not be dispersed in the water.

Two further series of batches as above were prepared. In one series vinyl acetate polymer of susbtantially the same granulation was substituted for the granular methyl methacrylate polymer while in the second series styrene polymer of substantially the same granulation was used. All of the batches in these series likewise exhibited absolutely uniform distribution of color.

Example III

An aqueous dispersion of "Monastral" Blue B (Pigments Index of 1945) was prepared by mixing 5 parts of this color, 95 parts water, and 2 parts "Alranol 90" for sixteen hours in a ball-mill mixer. This dispersion was diluted with 900 parts water.

270 parts of granular methyl methacrylate polymer of particle size in the range 0.2 mm. to 2 mm. were placed in a conventional double arm mixer and lumps removed as in Example I. 0.74 part of the above diluted dispersion and 0.74 part water were added and mixing continued for ten minutes.

The contents of the mixer were colloided as in Example I. The resulting product was free from color specks and foreign contamination, and was characterized by excellent distribution of color. Articles molded and extruded from this product exhibited no color streaks or mottle.

Example IV

The procedure of Example III was repeated with certain variations as indicated below.

Three series of batches were prepared using, respectively, granular polymers of methyl methacrylate, vinyl acetate, and styrene, with each of the following pigments: Cadmium Yellow Golden #4 (Pigments Index of 1945), Cadmium Red 1127 (Pigments Index of 1945), "Monastral" Green GT 486–D (Pigments Index of 1945), LP–4206 CP Milori Blue (Pigments Index of 1945), Chrome Orange YO–38–D (Pigments Index of 1945), and Yellow Toner YT–445–D (Pigments Index of 1945). In all of these batches the proportions of the aqueous dispersions were 5 parts pigment, 95 parts water, and one part dispersing agent. The specific dispersing agent for any particular batch was selected from the following: "Darvan #1" (a polymerized organic salt of an alkyl aryl sulfonic acid), "Daxad #11" (a polymerized organic salt of an alkyl aryl sulfonic acid), and "Duponol ME" (a higher fatty alcohol sulfate); there was no detectable difference regardless of which of these specific dispersing agents was used.

The distribution of the color in each of the above batches appeared absolutely uniform, this characteristic not being varied to any appreciable degree despite any of the variations in granular polymer, specific pigment, or specific dispersing agent.

Example V

In the manner of Example I a pigment dispersion was prepared by mixing 5 parts "Monastral" Blue B pigment, 95 parts water, and 0.5 part "Darvan #1." In the same manner a dye dispersion was prepared by mixing 5 parts Oil Red I, 95 parts water, and 0.5 part "Darvan #1."

1500 parts of granular styrene polymer of particle size in the range 0.21 mm. to 0.84 mm. were mixed with 1.6 parts of the Monastral Blue B dispersion and 0.8 part water for ten minutes in a double arm mixer. This quantity of dispersion represents a water content of about 0.15% by weight of polymer, the lower limit of water content in this invention. The mixture was added directly to a two roll mill heated to 325° F. (forward roll), 300° F. (back roll) and masticated for a total period of fifteen minutes, including time of addition. The product was characterized by uniform distribution of color. This procedure was repeated using the Oil Red I dispersion, and analogous results were obtained.

By way of contrast, the foregoing procedure was repeated except that 0.8 part of a dispersion of 10 parts color, 90 parts water, and 0.5 part of "Darvan #1" were used and no further water added. This represents a water content based on weight of polymer, of about 0.05%, appreciably below the water range of this invention. Both in the case where the color was the "Monastral" Blue B pigment and where it was the Oil Red I dye, color specks were visible in the resulting product and articles molded therefrom exhibited color mottle.

*Example VI*

Example V was repeated except that 1.6 parts of color dispersion and 11.9 parts of water were mixed with the polymer both in the case of the pigment dispersion and the dye dispersion. This represents a water content of about 0.9% by weight of the polymer, the upper limit of water content in this invention. The resulting product in both instances, as well as article molded therefrom, were characterized by uniform distribution of color.

By way of contrast the foregoing procedure was repeated except that 1.6 parts of color dispersion and 21.1 parts of water were used. This represents a water content of about 1.5% by weight of polymer, which is appreciably above the water range of this invention. Considerable handling difficulties were experienced in the mastication step and the products and articles produced therefrom exhibited non-uniform color distribution both in the case of the pigment dispersion and the dye dispersion.

*Example VII*

A dispersion was prepared by mixing 15 parts of Kosmos BB (carbon black, as a stabilizer), 85 parts water, 0.5 part "Darvan #1," and 0.5 part "Triton N-100" (an aryl alkyl polyether alcohol dispersing agent) for 16 hours in a ball-mill mixer.

300 parts of polyethylene resin of particle size 0.1 mm. to 0.5 mm., were mixed with 1.3 parts of the above dispersion in a conventional double arm mixer for a period of 15 minutes. The resulting mixture was transferred to a Banbury mixer where it was masticated at a temperature of 275° F. for a period of 5 minutes. The product was removed, sheeted on a two-roll mill, and subdivided into molding powder particle size. The product appeared to have the carbon black uniformly distributed therethrough.

The above procedure was repeated again substituting 15 parts of phenoxypropyleneoxide, a stabilizer, for the carbon black. It was repeated a second time substituting 15 parts of calcium carbonate, primarily a filler, for the carbon black. In both instances the water-dispersible material was uniformly distributed throughout the resulting product.

It will be understood that the above examples are merely illustrative and that the invention broadly comprises dispersing a water-dispersible material in water in the presence of a dispersing agent, mixing the resulting aqueous dispersion with a thermoplastic polymer in granular form of particle size between 0.1 mm. and 2.0 mm., in a proportion such that the total water content amounts to 0.15% to 0.9% by weight of said polymer, and then masticating the resulting mixture at a temperature at least as high as the flow temperature of the polymer until the mixture is colloided.

As will be readily apparent to those skilled in the art, this invention is broadly applicable to any granular thermoplastic polymer which is insoluble and unreactive with water. A certain degree of water sensitivity can be tolerated so long as water will not soften or tackify the polymer to the point where agglomeration of individual particles would result during the mixing step. Since the invention is one involving a mechanical action rather than a chemical one, the chemical entity of the polymer is of no concern. Obviously, the invention is more practical as applied to those polymers through which the uniform distribution of a water-dispersible material is required, for example, the various polymers used in the molding art where uniform coloration of the polymer is highly important.

It is impractical to list individually all of the polymers to which the invention is clearly applicable but there may be mentioned the thermoplastic polymers of ethylenically unsaturated organic compounds such as acrylic resins, vinyl ester polymers, vinyl acetal polymers, vinyl ether polymers, vinyl halide polymers, cellulose ester plastics, cellulose ether plastics, olefin polymers, styrene polymers, halogenated olefin polymers, polyamide resins, and synthetic rubbers.

The invention is particularly applicable to the following specific polymers which may be processed according to the method of this invention: polymethyl methacrylate, polymethyl acrylate, polyethyl methacrylate, polybutyl acrylate, polybutyl methacrylate, polyacrylonitrile, polyvinyl acetate, polyvinyl propionate, polyvinyl butyrate, vinyl chloride/vinyl acetate copolymer, polyvinyl chloride, vinyl chloride/maleic acid ester copolymer, vinyl acetate/fumaric acid ester copolymer, polyvinyl butyral, polyvinyl acetal, polyvinyl propional, polyallyl acetate, polyvinylidene chloride, cellulose acetate, cellulose propionate, cellulose acetate butyrate, ethyl cellulose, cellulose nitrate, cellulose nitroacetate, benzyl cellulose, polyethylene, ethylene/vinyl ester copolymers, certain water insoluble hydrolyzed ethylene/vinyl ester copolymer, polytrichlorofluoroethylene, halogenated polyethylene, rubber, polystyrene, Buna N, Buna S, neoprene, polydichloro styrene, polyhexamethylene adipamide, and polyhexamethylene sebacamide.

The invention is also applicable to plasticized polymers provided they are thermoplastic and substantially water-insoluble, as, for example, plasticized cellulose esters and ethers.

The particle size of the polymer is an important factor in the invention and it has been found that outside the particle range of 0.1 mm. to 2 mm. the advantages of the invention are rapidly lost. If appreciably larger particles than 2 mm. are used, the mastication period must be extended to obtain uniform distribution of the water-dispersible material and thus a disadvantage of the prior art is encountered. On the other hand, if smaller particles are employed, the amount of water needed to achieve uniform distribution of the water-dispersible material is so great than an additional drying step becomes necessary.

The invention is applicable to water-dispersible materials in general. A water-dispersible material may be defined as one of such particle size that it may be dispersed in water in the presence of a dispersing agent and that will not settle therefrom to any noticeable extent after standing four or five minutes. Clearly, the water-dispersible material must be water-insoluble and substantially inert to water, further, it should be inert with respect to the polymer, that is, it should not soften, tackify, or in any way effect the polymer so that the individual particles thereof will agglomerate during the mixing step and this must be particularly watched when the water-dispersible material is a liquid because some liquids are capable of causing such agglomeration.

There is a wide range of water-dispersible materials which are desirably added to thermoplastic polymers, including dyes, pigments, carbon black, sulfur, calcium carbonate, basic oxides, rosins, phenoxy propylene oxide, metal effect materials, metal oxides, natural resins, waxes, linters, and others. Incompatible synthetic resins may be distributed through thermoplastic polymers by the method of this invention.

The preparation of the aqueous dispersion for use in this invention is simply a matter of following the practice well known in the art. A dispersing agent will be required; the selection of a specific dispersing agent and the proportion in which it will be used, will present no problem to those skilled in the art. Generally, the dispersing agent will be used within the range of 0.1% to 3% by combined weight of the water and water-dispersible material. Water-soluble, non-foaming dispersing agents are preferred but others may be used. The dispersing agent may be anionic, cationic, non-ionic, mixed anionic cationic, or a protective colloid. A suitable dispersing agent may be chosen from the many disclosed in "Surface Active Agents" by Young and Coons, Chemical Publishing Company, Brooklyn, New York, 1945. A few preferred dispersing agents are polymerized organic salts of alkyl aryl sulfonic acids, partially hydrolyzed polyvinyl esters, sulfated aryl alcohols, quaternary ammonium salts, sodium alkyl naphthalene sulfonates, sulfosuccinic acid esters, sulfonated amides, partial esters of polyhydric alcohols with long chain carboxylic acids, sorbitol, esters of long chain polyethylene glycols, and others.

As shown particularly in Example II, the proportion of water-dispersible material to water has substantially no effect on the operability of this invention. That is, any proportion at all may be used between the perfectly obvious limits, namely, that which is so great, it will not give a dispersion at all and that which is so low, the required amount of water-dispersible material cannot be distributed through the polymer within the upper limit of water it is permissible to add to the polymer.

The quantity of water, either as aqueous dispersion or additional water added to the polymer used in the practice of this invention is very critical, and the concentration limits indicated must be observed if the process is to operate. If less than 0.15% total water by weight of the polymer is employed, it is not possible to achieve a uniform distribution of the water-dispersible material even with prolonged mixing unless the mastication step is extended in duration to that of prior art methods. In no case where appreciably less than 0.15% water is used, is it possible within any reasonable period of time to achieve uniform distribution of water-dispersible material by mixing alone. If more than 0.9% total water by weight of the polymer is employed, the water-dispersible material and the polymer tend to agglomerate. Great excesses of water eliminate this tendency to agglomerate but then a separate drying step is necessary for removal of excess water. Not only is this added step uneconomical and a nuisance but filtration, spray drying, and similar methods of getting rid of the water destroy the uniform distribution of water-dispersible material and the resulting product cannot be used for production of streak and mottle-free articles. It is possible while operating within the spirit of this invention to prepare concentrate batches which contain more than the maximum permissible amount of water, but the distribution of water-dispersible material in such batches is not uniform, and does not become uniform until the batch is mixed with sufficient additional granular thermoplastic polymer to bring the total water content within the specified range. Although such a method of operating is within the scope of this invention, it is not preferred under ordinary circumstances.

The temperature employed in the mastication step must be higher than the flow temperature of the particular thermoplastic polymer involved and, obviously, below that temperature which would cause degradation of the polymer involved. The flow temperature of a thermoplastic polymer may be determined by ASTM method D-569-41T. It is preferred that the mastication temperature be at least 10° F. or so above the flow temperature of the polymer and not more than 150° F. above, although temperatures up to 300° F. above may be used. An outstanding advantage of the invention is that mastication of the mixture merely to the point where the polymer is colloided, is sufficient to insure uniform distribution of the water-dispersible material throughout the polymer. This is in striking contrast to the prior art practice of masticating for long periods in an effort to effect uniform distribution with the attendant danger of degradation of the polymer and adversely affecting various ingredients in the plastic. Usually, a total period of mastication, including the time involved in adding the polymer mixture to the rolls or the like, will be from ten to fifteen minutes.

Some compositions may be masticated safely beyond the point where the polymer has just become colloided and the mastication may be extended in such cases, if desired, so long as conditions do not favor foreign contamination which is an additional danger attendant on prolonged mastication. The mastication may be carried out on rolls, in a Banbury mixer, or other conventional equipment for the purpose. Stainless steel, chromium, or nickel equipment is preferred.

Inclusion of the mastication step is heavily preferred in this invention and, in many instances, is absolutely essential for satisfactory results. However, in some instances the mastication step may be dispensed with and satisfactory results obtained by molding or extruding the granular polymer directly after it is merely mixed with the aqueous dispersion. It is necessary, in order to do this, that the molding or extrusion equipment be adapted to handle plastic in such form. Normally, the mastication step is necessary to permit the formation of the larger, more easily handled particles for which the molding apparatus is designed and, since the polymer is colloided in the mastication step, to eliminate all opportunity for redistribution of the water-dispersible material by settling or otherwise.

This invention covers a process which is free from the many disadvantages of prior art methods. Practice of this invention permits minimum processing cycles, and eliminates many of the causes for foreign contamination of the product. Close control may be exercised of shades of color and concentration of modifiers, control tests being possible at several stages of the process. Thermoplastic polymers having constituents added according to this invention may be reproduced countless times with uniform results. This invention is particularly advantageous for use in coloring thermoplastic polymers, and provides a dependable method for manufacture of light, clear shade transparent thermoplastic polymer molding and extrusion powders.

As many apparently widely different embodiments of this invention may be made without departing from the spirit and scope thereof, it is to be understood that the invention is not limited to the specific embodiments thereof except as defined in the appended claims.

I claim:

1. Process of distributing a water-dispersible material uniformly throughout a water-insoluble thermoplastic polymer, said water-dispersible material being inert with respect to said polymer, which comprises dispersing said water-dispersible material in water in the presence of a dispersing agent, mixing the resulting aqueous dispersion with said thermoplastic polymer in granular form of particle size between 0.1 mm. and 2 mm., in a proportion such that the total water content amounts to 0.15% to 0.9% by weight of said polymer, and then masticating said resulting mixture at a temperature at least as high as the flow temperature of said polymer until said mixture is colloided.

2. Process as set forth in claim 1 wherein said water-dispersible material is a color.

3. Process as set forth in claim 1 wherein said thermoplastic polymer is methyl methacrylate polymer.

4. Process of distributing a water-dispersible color uniformly throughout a water-insoluble thermoplastic polymer which comprises dispersing said water-dispersible material in water in the presence of a dispersing agent, mixing the resulting aqueous dispersion with said thermoplastic polymer in granular form of particle size between 0.1 mm. and 2 mm., in a proportion such that the total water content amounts to 0.15% to 0.9% by weight of said polymer, and then masticating said resulting mixture at a temperature of 10° F. to 150° F. above the flow temperature of said polymer until said mixture is colloided.

5. Process as set forth in claim 4 wherein said thermoplastic polymer is methyl methacrylate.

6. Process of distributing a water-dispersible material uniformly throughout methyl methacrylate polymer, said water-dispersible material being inert with respect to said methyl methacrylate polymer, which comprises dispersing said water-dispersible material in water in the presence of a dispersing agent, mixing the resulting aqueous dispersion with granular methyl methacrylate polymer of particle size between 0.1 mm. and 2 mm., in a proportion such that the total water content amounts to 0.15% to 0.9% by weight of said polymer, and then masticating said resulting mixture at a temperature at least as high as the flow temperature of said polymer until said mixture is colloided.

7. Process as set forth in claim 6 wherein said water-dispersible material is a color.

8. Process of distributing a water-dispersible color uniformly throughout methyl methacrylate polymer which comprises dispersing said color in water in the presence of a dispersing agent, mixing the resulting aqueous dispersion with granular methyl methacrylate polymer of particle size between 0.1 mm. and 2 mm., in a proportion such that the total water content amounts to 0.15% to 0.9% by weight of said polymer, and then masticating said resulting mixture at a temperature from 10° F. to 150° F. above the flow temperature of said polymer until said mixture is colloided.

9. Process as set forth in claim 8 wherein the proportion of dispersing agent is between 0.1% and 3% by weight of the water and color.

10. Process as set forth in claim 9 wherein said color is a water-dispersible pigment.

11. Process as set forth in claim 9 wherein said water-dispersible color is a dye.

JOHN ABELN CONNELL.

REFERENCES CITED

The following references are of record in the file of this patent:

UNITED STATES PATENTS

| Number | Name | Date |
| --- | --- | --- |
| 2,309,522 | Marks | Jan. 26, 1943 |

Certificate of Correction

Patent No. 2,480,821 September 6, 1949

JOHN ABELN CONNELL

It is hereby certified that errors appear in the printed specification of the above numbered patent requiring correction as follows:

Column 7, line 8, for the word "than" read *that*; column 10, line 14, after "methacrylate" and before the period insert *polymer*;

and that the said Letters Patent should be read with these corrections therein that the same may conform to the record of the case in the Patent Office.

Signed and sealed this 31st day of January, A. D. 1950.

[SEAL]

THOMAS F. MURPHY,
*Assistant Commissioner of Patents.*